US007826475B2

(12) United States Patent
Lee et al.

(10) Patent No.: US 7,826,475 B2
(45) Date of Patent: Nov. 2, 2010

(54) RADIO COMMUNICATION SYSTEM, RADIO COMMUNICATION APPARATUS AND RADIO COMMUNICATION METHOD FOR UWB IMPULSE COMMUNICATION

(75) Inventors: Hyung-Soo Lee, Daejeon (KR);
Cheol-Hyo Lee, Daejeon (KR);
Dan-Keun Sung, Daejeon (KR);
Chang-Yong Jung, Chungcheongbuk-do (KR); Jo-Woon Chong, Seoul (KR);
Min-Jeong Kim, Daegu (KR); Dong-Jo Park, Daejeon (KR); Young-Jun Hong, Seoul (KR); Bang-Chul Jung, Seoul (KR); Sung-Yoon Jung, Seoul (KR);
Mi-Kyung Oh, Gyeongsangbuk-do (KR); Ki-Ho Kil, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 736 days.

(21) Appl. No.: 11/718,262

(22) PCT Filed: Nov. 1, 2005

(86) PCT No.: PCT/KR2005/003647

§ 371 (c)(1),
(2), (4) Date: Apr. 30, 2007

(87) PCT Pub. No.: WO2006/049415

PCT Pub. Date: May 11, 2006

(65) Prior Publication Data

US 2009/0067389 A1 Mar. 12, 2009

(30) Foreign Application Priority Data

Nov. 1, 2004 (KR) .................... 10-2004-0087904

(51) Int. Cl.
*H04L 12/413* (2006.01)

(52) U.S. Cl. .................. 370/445; 370/348; 370/447; 370/448

(58) Field of Classification Search .............. None
See application file for complete search history.

(56) References Cited

U.S. PATENT DOCUMENTS

| 2002/0105970 A1 | 8/2002 | Shvodian |
| 2003/0137993 A1 | 7/2003 | Odman |
| 2003/0152059 A1* | 8/2003 | Odman ..................... 370/338 |
| 2004/0022219 A1 | 2/2004 | Mangold et al. |
| 2005/0030927 A1* | 2/2005 | Mucke ....................... 370/336 |
| 2005/0122928 A1* | 6/2005 | Vijayan et al. ............... 370/312 |
| 2008/0019329 A1* | 1/2008 | Benveniste .................. 370/337 |

FOREIGN PATENT DOCUMENTS

| KR | 10-2004-0048288 | 6/2004 |
| WO | WO 99-14898 | 3/1999 |
| WO | WO 03-063434 | 7/2003 |

OTHER PUBLICATIONS

Callaway, E., et al., "Home Networking with IEEE 802.15.4: A Developing Standard for Low-Rate Wireless Personal Area Networks." Aug. 2002. *IEEE Communications Magazine*, pp. 70-77.

* cited by examiner

*Primary Examiner*—Ajit Patel
(74) *Attorney, Agent, or Firm*—Ladas & Parry LLP

(57) ABSTRACT

Provided is a radio communication system for ultra wideband (UWB) impulse communications and a radio communication apparatus and method thereof. The present patent provides a radio communication system that can minimize power consumption by eliminating a need for carrier detection and sharing transmission/reception time information in UWB impulse communications. The system includes a network coordinator; and one or more devices communicating on a superframe basis in subordination to the network coordinator. The devices perform data transmission/reception in predetermined time slots and then they are inactivated to thereby reduce power consumption.

23 Claims, 11 Drawing Sheets

RADIO COMMUNICATION SYSTEM, RADIO COMMUNICATION APPARATUS AND RADIO COMMUNICATION METHOD FOR UWB IMPULSE COMMUNICATION

TECHNICAL FIELD

The present invention relates to a radio communication system for ultra wideband (UWB) impulse communications, a radio communication apparatus, and a radio communication method thereof; and, more particularly, to a radio communication system that can be applied to a sensor network using UWB impulse signals or a low-rate Wireless Personal Area Network (WPAN) environment, a radio communication apparatus, and a radio communication method thereof.

BACKGROUND ART

According to Carrier Sensing Multiple Access/Collision Avoidance (CSMA/CA), which is a conventional multiple access method, transmission is performed when an idle channel is detected through carrier sensing, or when the channel is busy, transmission is postponed through backoff, which is revealed in the IEEE 802.15.4 Low-Rate WPANs Specification.

However, since the CSMA/CA method uses UWB impulse signals as short as less than several nanoseconds, the signal acquisition time taken for searching and determining accurate timing information of an impulse signal becomes long, compared to conventional systems using narrow band signals and when judging the presence of a signal, the probability of false alarm is high. Therefore, when the conventional CSMA/CA method is applied for multiple access in the ultra wideband impulse communication system, there is a problem that the performance of the CSMA/CA method is degraded remarkably.

Devices of a sensor network or a low-rate Wireless Personal Area Network (WPAN) should be designed to minimize power consumption when a communication scheme is designed because they are usually operated with small batteries. However, when the CSMA/CA method is used for multiple access in the ultra wideband (UWB) impulse communication system, the transmitting part of each device can begin transmission only when a channel is in an idle state. Thus, it should be in an active state while it monitors the channel. Also, since the receiving part of each device cannot know when the transmitting part begins transmission, it also has to remain in the active state while the channel is monitored. In short, since the transmitting and receiving parts of each device should remain in the active state while the channel is monitored, there is a problem of high power consumption.

Therefore, required are multiple access and communication methods that can minimize power consumption in the sensor network using UWB impulse communications or the low-rate WPAN environment and perform transmission and reception in a simple structure.

Since the sensor network can consist of more than hundreds to thousands devices, it is hard to support all the devices with the CSMA/CA technology which uses one channel. Therefore, a method for managing devices in a simple structure is needed.

Furthermore, since symbol-based Binary Exponential Backoff used in the conventional CSMA/CA method cannot relieve collisions between the devices, a hierarchical backoff method, which is an extended form of the symbol-based Binary Exponential Backoff, is required.

Compared to the conventional narrow band system using a band of several MHz, a band of 3.1 GHz to 10.6 GHz is split into bands of 500 MHz to bands of several GHz and each multi-piconet uses each split band in the ultra wideband impulse communication system. Thus, there is a problem that each sensor is too small to accommodate the transmitting and receiving parts having complicated functions to support bands of 500 MHz to bands of several GHz. This calls for the development of a method that can reduce the complexity in the transmitting and receiving structure and operate the multi-piconets in a simple method.

In addition, when an arbitrary time hopping pattern is determined and used between transmission and reception to apply an ultra wideband impulse signal to a time hopping system, it becomes more complicated to manage the time hopping pattern when there is a great deal of devices operated in the system. Therefore, a method that can simply manage the time hopping pattern in a simple manner is required.

DISCLOSURE

Technical Problem

The first objective of the present invention is to provide a radio communication method without carrier detection in an ultra wideband (UWB) impulse communication system.

The second objective of the present invention is to provide a radio communication system that can reduce power consumption by activating radio communication apparatuses to transmit/receive data in a predetermined time slot and by inactivating them in the other time slots in a radio network formed of a plurality of radio communication apparatuses and a coordinator which communicates with the radio communication apparatuses on a superframe basis.

The third objective of the present invention is to provide a radio communication apparatus that can operate in a radio network in a radio communication environment where a plurality of radio networks are operated under control of the network coordinators.

The other objectives and advantages of the present invention can be understood by the following description and become apparent with reference to preferred embodiments of the present invention. Furthermore, it is apparent that the objectives and advantages of the present invention can be easily realized by the means as claimed and combinations thereof.

Technical Solution

In accordance with one aspect of the present invention, there is provided a radio communication system, which includes: a network coordinator for operating a network; and one or more devices participating in communication on a superframe basis in subordination to the network coordinator, wherein the superframe includes: a beacon period in which the network coordinator transmits a beacon; a contention access period in which the devices contend with each other for multiple access; and a contention-free period in which the network coordinator allocates time slots to devices in need of time slots among the devices and the devices with time slots allocated thereto can make an access without contention, and the network coordinator divides the devices into one or more groups and allocates time slots of the contention period to each group.

In accordance with another aspect of the present invention, there is provided a radio communication system, which includes: a plurality of radio networks each of which includes a plurality of radio communication apparatuses; and a network coordinator communicating with the radio communication apparatuses on a superframe basis, wherein the superframe includes an active period in which the radio communication apparatuses of a network participate in communication while maintaining an active state; and an inactive period in which the radio communication apparatuses of the network remain in an inactive state, and the network coordinator operating a radio network controls the active period of the radio network to appear in the inactive period of another radio network.

In accordance with another aspect of the present invention, there is provided a radio communication method in a radio network including a plurality of radio communication apparatuses and a network coordinator communicating with the radio communication apparatuses on a superframe basis, which includes the steps of: a) dividing the radio communication apparatuses into a predetermined number of groups and allocating time slots to each group in a contention access period in the network coordinator; and b) transmitting data in each radio communication apparatus by randomly accessing to time slots allocated to a group to which the radio communication apparatus belongs, wherein the superframe includes: a beacon period in which the network coordinator transmits a beacon; a contention access period in which the radio communication apparatuses contend with each other for multiple access; and a contention-free period in which the network coordinator allocates time slots to radio communication apparatuses in need of time slots among the radio communication apparatuses and the radio communication apparatuses with time slots can make an access without contentions.

In accordance with another aspect of the present invention, there is provided a radio communication method in a radio communication environment including a plurality of radio networks operating under control of a network coordinator, which includes the steps of: a) establishing a superframe period including an active period and an inactive period and transmitting beacon information in the active period in a network coordinator of any one radio network; and b) controlling the active period of the superframe to appear in the inactive period based on the beacon information in a network coordinator of another radio network.

In accordance with another aspect of the present invention, there is provided a radio communication method in a radio network including a plurality of radio communication apparatuses and a network coordinator communicates with the radio communication apparatuses on a superframe basis, which includes the steps of: a) acquiring a beacon broadcasted by the network coordinator through channel scanning in any one radio communication apparatus; and b) accessing to arbitrary time slots of the contention access periods and transmitting association request information to the network coordinator in the radio communication apparatus, wherein the superframe includes: a beacon period in which the network coordinator transmits the beacon; a contention access period in which the network coordinator divides the radio communication apparatuses into one or more groups and allocates available time slots to each group; and a contention-free period in which the network coordinator allocates time slots to radio communication apparatuses in need of time slots among the radio communication apparatuses and the radio communication apparatuses with the time slots allocated thereto can make an access without contentions.

In accordance with another aspect of the present invention, there is provided a radio communication apparatus operating as a network coordinator in a radio communication environment where a plurality of radio networks operate under control of the network coordinator, which includes: a transmitting means for modulating and transmitting data to outside; a clock providing means for providing clocks based on a predetermined superframe period; and a controlling means for generating beacon information based on the clocks and transmitting the beacon information to outside through the transmitting means, wherein the beacon information includes: group management information on one or more groups of radio communication apparatuses which are obtained by grouping a plurality of radio communication apparatuses of the radio network; and time slot allocation information on time slots in a contention access period of the superframe, the time slots allocated to each group.

In accordance with another aspect of the present invention, there is provided a radio communication apparatus operating in a radio communication environment where a plurality of radio networks operate under control of a network coordinator, which includes: a transmitter for modulating and transmitting data to outside; a receiver for receiving beacon information from outside; a controller for setting up a superframe period based on the beacon information; and a clock providing unit for providing clocks based on the superframe period of the controlling means, wherein the beacon information includes: superframe timing information; group management information on one or more groups of radio communication apparatuses which are obtained by grouping a plurality of radio communication apparatuses of the radio network in the network coordinator; and time slot allocation information on time slots in a contention access period of the superframe, the time slots allocated to each group.

Advantageous Effects

The technology of the present invention can minimize power consumption and transmit/receive data in a simple structure in a sensor network or a low-rate Wireless Personal Area Network (WPAN) using an ultra wideband (UWB) impulse signal.

Also, the technology of the present invention can decentralize traffic of devices and relieve collisions between the devices by using a pre-arbitrated slot allocation-based Media Access Control (MAC) Protocol where a plurality of devices are divided into a predetermined number of groups and a predetermined number of slots are allocated to each group.

Also, since the technology of the present invention does not need carrier detection, it works in a network not capable of detecting carriers or an environment where carrier cannot be detected, i.e., in a network using a physical layer such as ultra wideband impulse communication.

Also, since the technology of the present invention uses a superframe based binary exponential backoff method and time slot based backoff method simultaneously when a collision occurs in a contention access period, it can relive the collisions better than the conventional method.

Also, since the technology of the present invention specifies transmission and reception roles of time slots in a contention access period and guaranteed time slots in a contention-free period, it can reduce protocol complexity and reduce power consumption compared to conventional Carrier Sensing Multiple Access (CSMA) method to thereby lengthen communication time through a power management where constitutional elements wake up in corresponding slots to perform data transmission and reception and they are inactivated in the other time slots.

Also, the technology of the present invention can reduce the number of transmissions and receptions and simplify the communication scheme not by transmitting acknowledgement information for data transmission from the constitutional devices or responses to requests from the constitutional devices individually in the corresponding slots, but by informing them all at once by putting them in a beacon and transmitting the beacon.

Also, the technology of the present invention can manage hopping patterns simply by defining a time hopping pattern according to each time slot and each guaranteed time slot and using a hopping pattern corresponding to a slot in data transmission/reception while sharing the hopping pattern information in a network. In other words, it is easy to receive data and detect collisions, as the data are received based on a predefined hopping pattern. Also, the technology of the present invention can relieve spectral characteristics in conformity to a spectrum regulation in the UWB communication system and suppress the interference signal to another networks.

Also, the technology of the present invention can operate multi-piconets by not overlapping active periods of superframes for each piconet temporally when multi-piconets are operated by simply controlling superframe and timing information, such as active period and inactive period. When the multi-piconets are operated without active periods of piconets overlapped with each other temporally and data need to be transmitted between piconets, the data are relayed through a repeater in communication between two piconets to both of which it belongs. Thus, the technology of the present invention can extend a network by relaying data between piconets.

Also, the technology of the present invention can be applied to a physical layer suggestion based on ultra wideband communication in an activity for standardizing a physical layer for a low-rate WPAN based on the IEEE 802.15.4a, i.e., a group for standardization.

DESCRIPTION OF DRAWINGS

The above and other objectives and features of the present invention will become apparent from the following description of the preferred embodiments given in conjunction with the accompanying drawings, in which.

BEST MODE FOR THE INVENTION

Other objectives and aspects of the invention will become apparent from the following description of preferred embodiments, and the technological concept of the present invention will be easily implemented by those skilled in the art of the present invention. Also, when it is determined that the detailed description of prior art may blur the point of the present invention unnecessarily, the description will not be provided herein. Hereinafter, the preferred embodiments of the present invention will be described with reference to the accompanying drawings, which is set forth hereinafter.

Figure 1:
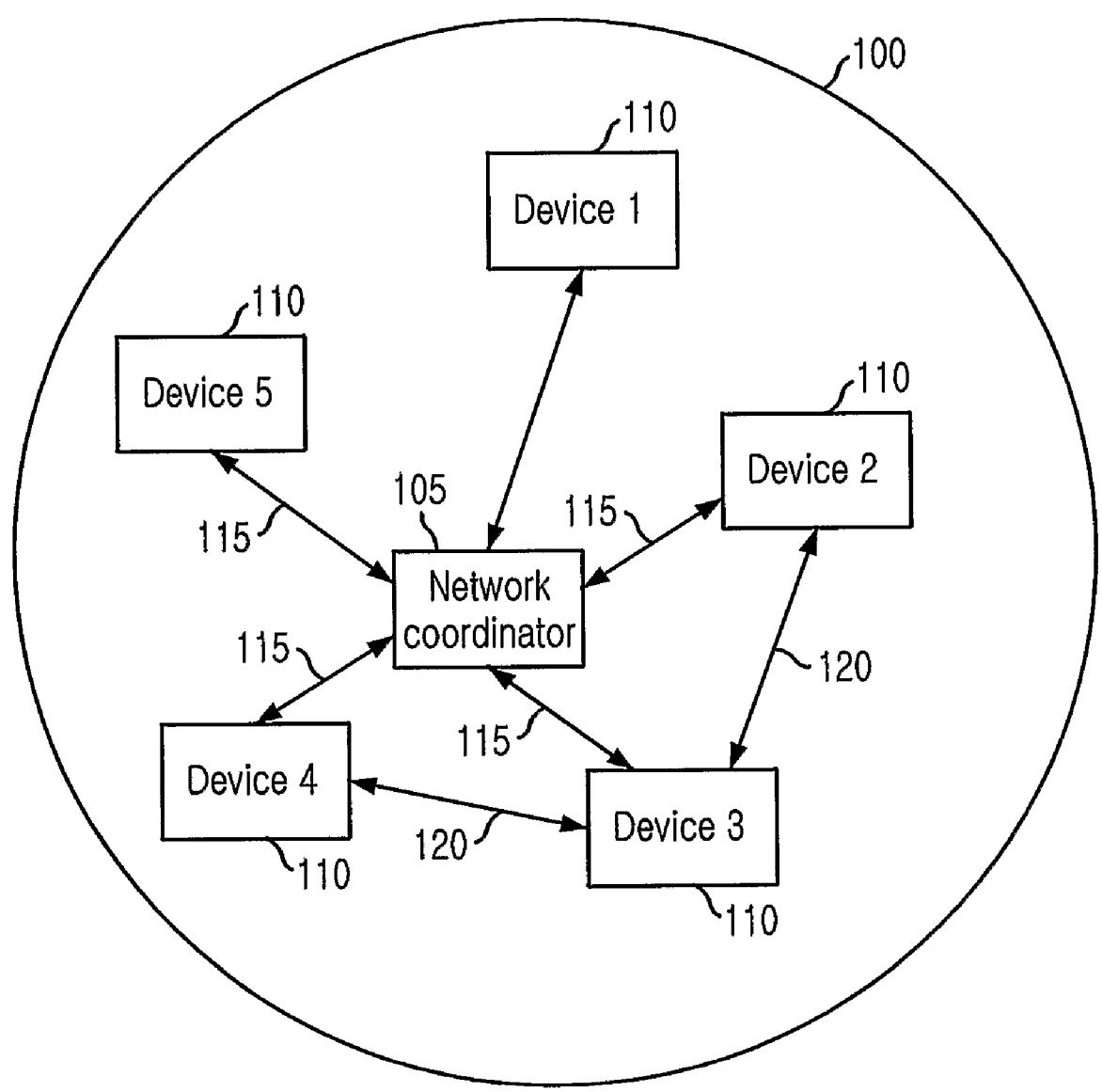
FIG. 1 is a diagram illustrating a network in accordance with an embodiment of the present invention.

FIG. 1 is a diagram illustrating a network in accordance with an embodiment of the present invention. A network 100 is a Wireless Personal Area Network (WPAN) or a piconet but it can be a wireless Local Area Network (WLAN) or another type of radio network in which a plurality of users share bandwidths.

As described in FIG. 1, the network 100 includes one network coordinator 105 and one or more devices 110. The network coordinator 105 can be a predetermined device or just one of devices selected to function as a coordinator.

The network coordinator 105 communicates with the devices 110 based on various control operations within the network, and the devices 110 acquire information needed for communication by receiving control information from the network coordinator 105. The devices 110 basically communicate (see 115) with the network coordinator 105 and also communicate (see 120) with each other. Each of the devices 110 communicates (see 120) with a reference device to acquire distance information and provide a positioning service to users.

Figure 2:
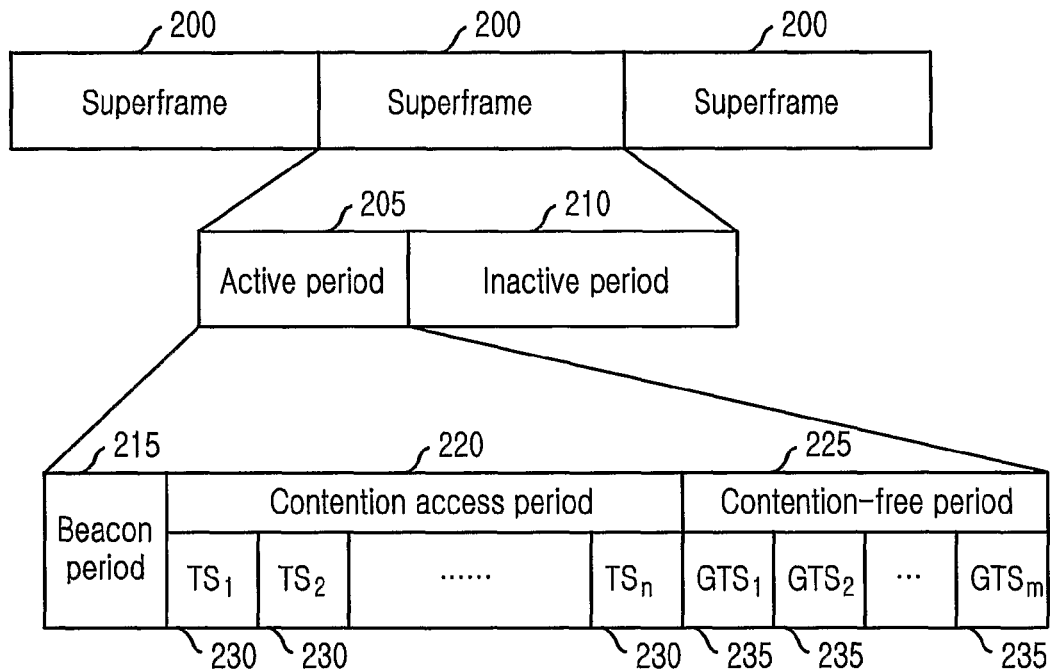
FIG. 2 is a diagram describing a superframe in accordance with an embodiment of the present invention.

FIG. 2 is a diagram describing a superframe in accordance with an embodiment of the present invention. A superframe is a basic unit for communication in the present invention.

As shown in FIG. 2, each of consecutive superframes 200 is divided into an active period 205 where the network coordinator 105 and the devices 110 are activated to communicate with each other and an inactive period 210 where the network coordinator 105 and the devices 110 are inactivated. Herein, the active period 205 is divided into a beacon period 215, a Contention Access Period (CAP) 220, and a Contention-free Period (CFP) 225.

In the beacon period 215, the network coordinator 105 puts control information needed to operate the network and messages for the devices 110 into a beacon and broadcasts the beacon throughout the network. The devices 110 synchronize the time of the time slots based on the time when the beacon is received, and prepare for data transmission/reception based on the control information and the messages in the beacon.

The contention access period 220 is formed of one or more time slots (TS), i.e., $TS_1, TS_2, TS_3, \ldots, TS_n$ where $1 \leq n$. The network coordinator 105 classifies the devices 110 of the network 100 into one or more groups, i.e., $G_1, G_2, \ldots, G_g$ where $1 \leq g$, and allocates one or more time slots 230 to be used for each group in advance. Each of the devices 110 randomly accesses to the allocated slots to reduce collisions between the devices 110 of its group. Each of the devices 110 selects one or more time slots 230 among the time slots allocated for the group to which the device 110 belongs. Each device 100 randomly accesses to slots allocated to its group in such a manner that collisions between the device and the other devices 110 in its group can be reduced. The device 110 selects one or more time slots among the time slots allocated to a group to which the device belongs and transmits data through contention with the other devices of its group. The multiple access method is referred to as a Pre-arbitrated Slot Allocation Based MAC Protocol.

In the contention access period 220, it is the characteristics of a sensor network that most of the communication is an up-link communication from the devices 110 to the network coordinator 105. The purpose of this communication method is to reduce power consumption by activating the devices 110 and transmitting data at the corresponding time slots when there are data to be transmitted, or maintaining the inactive mode when there are no data to be transmitted.

In the contention access period 220, it is possible to perform downlink communication from the network coordinator 105 to the devices 110. The downlink communication includes unicast where the network coordinator 105 broadcasts data to a device 110 in the network, multicast where the network coordinator 105 broadcasts data to a group of devices 110 in the network, and broadcast where the network coordinator 105 broadcasts data to all the devices 110 in the network. In this case, the network coordinator 105 puts information of time slots 230 to be used for downlink communication among the time slots 230 of the contention access period 220 within a corresponding superframe 200 into a beacon and broadcasts the beacon. Herein, the devices 110 of the network receive the beacon, check out the time slots 230 for downlink communication upon receipt of the beacon information, make the time slot 230 be used only for the downlink communication by restricting that the predetermined groups use the time slots 230 which are allocated to the predetermined groups for up-link communication in the time slots 230, and activate the time slots 230 for the downlink communication to receive needed information.

A contention-free period 225 is formed of one or more guaranteed time slot (GTS), e.g., $GTS_1$, $GTS_2$, ..., $GTS_m$ where $1 \leq m$. The devices 110 of a network request the network coordinator 105 for use of guaranteed time slots 235 in a contention access period 220 to use the guaranteed time slots 235. The network coordinator 105 allocates the guaranteed time slots 235 of a contention-free period 225 of the next superframe 200 to the devices 110 which have requested the use of the guaranteed time slots 235 including the network coordinator 105 itself through scheduling in consideration of request information transmitted from the devices 110 and whether the network coordinator 105 itself is used or not. In other words, the network coordinator 105 puts information on the devices 110 allocated with the guaranteed time slot allocation information, i.e., $GTS_i$ where $i \in \{1, 2, \ldots, m\}$, into a beacon in a beacon period 215 and broadcasts the beacon, while the devices 110 receive the beacon information and use the allocated guaranteed time slots 235.

As described above, multiple access is carried out based on time division in the contention-free period 225. In the guaranteed time slots 235 of the contention-free period 225, the devices 110 including the network coordinator 105 can communicate with each other, and the devices can be used for relaying, positioning, and transmission of a higher quality of service (QoS) according to usage.

Just as the contention access period 220, guaranteed time slots 235 for downlink communication can be allocated and used in a contention-free period 225. If necessary, the network coordinator 105 can establish one or more guaranteed time slots 235 for downlink communication in a contention-free period 225, inform the network of them by using a beacon so that those devices 110 in need can be activated in the time slots for downlink communication and receive data. In short, it is possible to perform downlink communication in all the beacon period 215, the contention access period 220, and the contention-free period 225, and the period to be used is determined based on the conditions of the network.

The structure of a superframe and parameters for an algorithm, which will be described later, are established according to a network operation policy and stored in a storage 305 of FIG. 3. A controller 301 of FIG. 3 controls the data transmission/reception based on the parameters by using timing information of a system clock unit 302.

Figure 3:
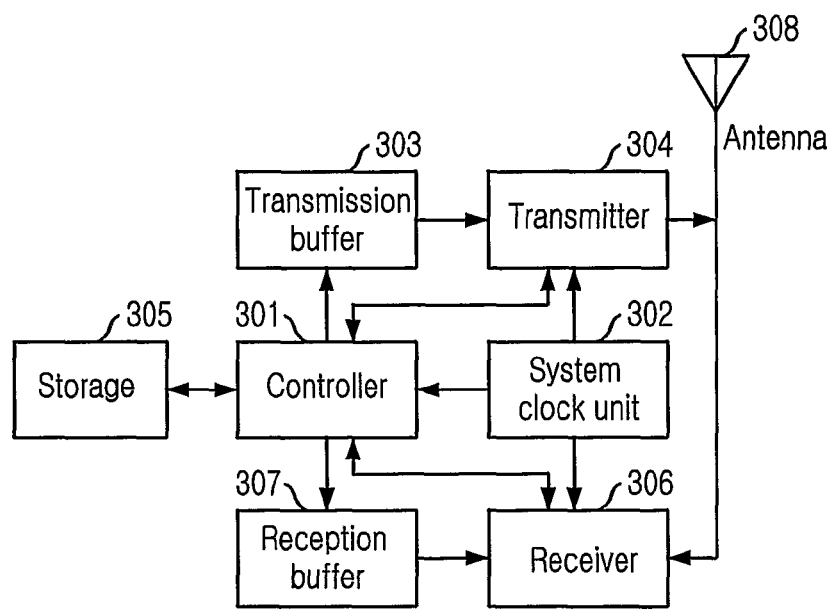
FIG. 3 is a block diagram showing a radio communication apparatus operated in a network in accordance with an embodiment of the present invention.

FIG. 3 is a block diagram showing a radio communication apparatus operated in a network in accordance with an embodiment of the present invention. The radio communication apparatus of FIG. 3 performs the operation of the network coordinator 105 which are shown in FIG. 1 and an general device 110.

As shown in FIG. 3, the controller 301 of the radio communication apparatus transmits data in a transmission buffer 303 to a transmitter 304 based on the timing information of the system clock unit 302. The transmitter 304 modulates the data in the transmission buffer 303 and transmits them to the outside through an antenna 308. Meanwhile, when a receiver 306 receives a radio frequency (RF) signal from the outside through the antenna 308, it demodulates the RF signal based on the timing information of the system clock unit 302 under the control of the controller 301 and stores the received data in a reception buffer 307.

Herein, the controller 301 controls data transmission and reception based on a communication protocol function of an execution program stored in the storage 305. The storage 305 includes the structure of a superframe and system parameters therefor, operation procedures, transmission and reception structures needed for modulation and demodulation and parameters therefor, and protocol algorithm functions needed for communication.

When the radio communication apparatus of FIG. 3 functions as the network coordinator 105, the storage 305 includes functions needed for controlling the network as well as contents included in the general devices 110. Thus, beacon information is generated in the controller 301 in the radio communication apparatus operated by the network coordinator 105, and the generated beacon information is transmitted in the transmitter 304 according to a timing of a predetermined superframe period generated from the system clock unit 302.

Meanwhile, when the radio communication apparatus functions as a general device 110, it receives the beacon information transmitted from the network coordinator 105 in the receiver 306 according to the timing of the predetermined superframe period, establishes the superframe period, periods within the superframe, and timing information of time slots based on the beacon information, and operates in subordination to the network coordinator 105.

Figure 4:
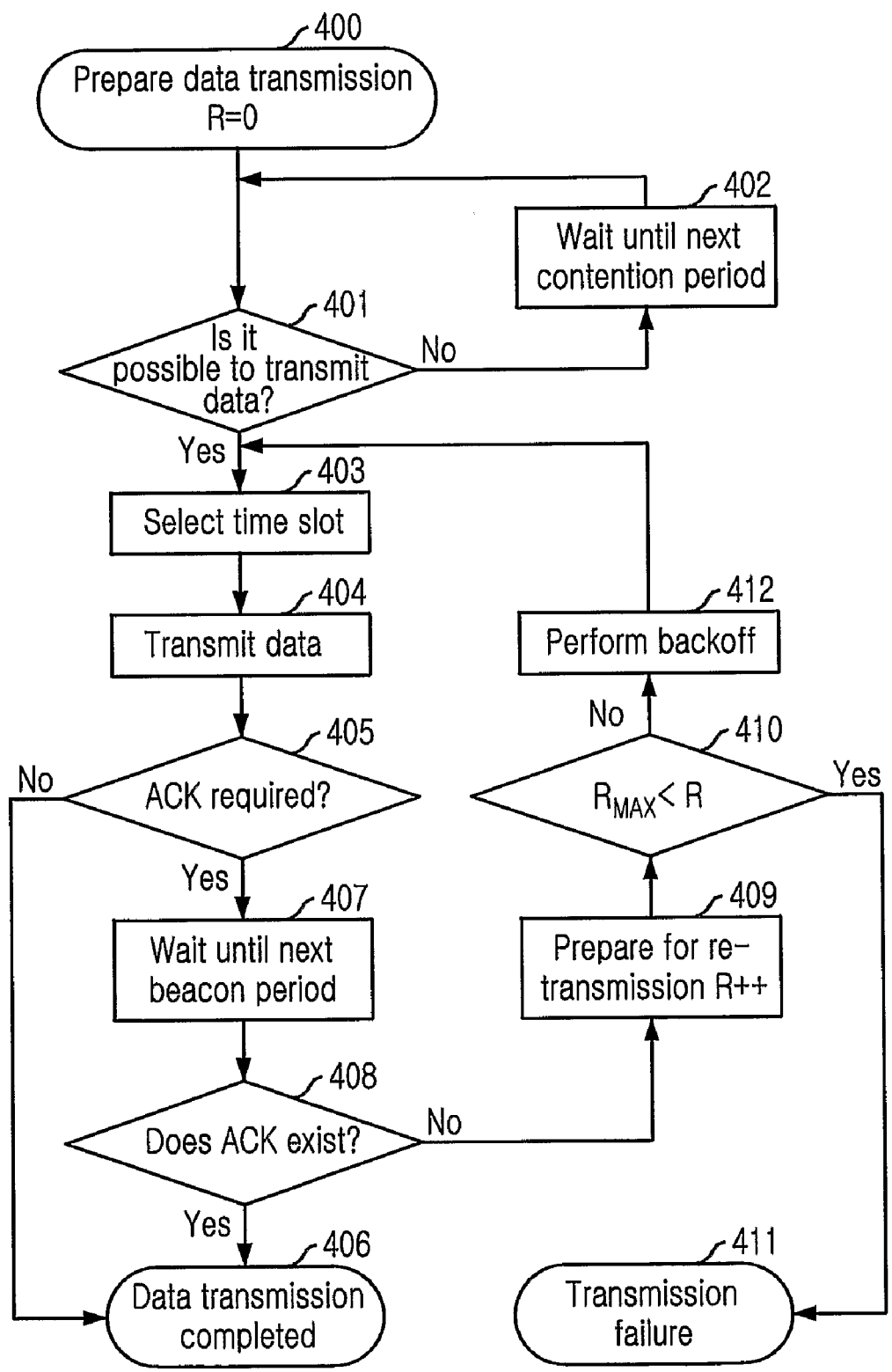
FIG. 4 is a flowchart describing a process of transmitting data between a general device and a network coordinator in a contention access period in accordance with an embodiment of the present invention.

FIG. 4 is a flowchart describing a process of transmitting data between a general device and a network coordinator in a contention access period in accordance with an embodiment of the present invention. An operation algorithm in a contention access period and parameters therefor are included in the storage 305 of the network coordinator 105 and the general device 110 and executed by the controller 301.

As illustrated in FIG. 4, the device 110 initializes a parameter R indicating the number of re-transmissions in step 400, when data to be transmitted to the network coordinator 105 are generated. In step 401, the device 110 determines whether data can be transmitted at a time point when the data are generated.

When the data are not generated in a contention access period 220 or although the data are generated in a contention access period 220, when the allocated time slot of the device 110 is not available, that is, when the time of the corresponding time slots has passed by, or when the time slot cannot be used because it is reserved for downlink communication by the network coordinator 105, the device 110 remains in an inactive state until the next contention access period 220 in step 402. When the new contention access period 220 begins, the device determines again whether the data can be transmitted or not in the step 401.

When the data are generated in a contention access period 220 and there are more than one time slot allocated for the device 110, the device 110 makes a random selection among the available time slots in step 403. When available time slots are selected, data are transmitted to the network coordinator 105 in step 404 at time corresponding to the time slots.

In step 405, after data are transmitted to the network coordinator 105, it is checked in step 405 whether acknowledgement information is needed for the transmitted data. When the acknowledgement information is not needed, the data transmission is completed in step 406. Otherwise, if the acknowledgement information is needed, it is checked whether or not the beacon information broadcasted in the network in the next beacon period includes acknowledgement information in steps 407 and 408.

When the acknowledgement information is received, it is determined in the step 406 that the data transmission is completed. Otherwise, the number of data re-transmissions, R is increased by one and re-transmission is prepared in step 409. When the data re-transmission is prepared, the increased number of data re-transmissions is compared with the maximum available number of retransmissions, $R_{MAX}$ in step 410. When it is turned out that R exceeds $R_{MAX}$, the transmission of that data is regarded as a failure in step 411. Otherwise, a backoff process is performed in step 412. After the backoff, a time slot available in the corresponding contention access period is selected and transmitted repeatedly.

In the time slot 230 of the contention access period 220, each of the devices 110 can transmit not only data but also request information, such as a request for guaranteed time slot 235 of a contention-free period 220, to the network coordinator 105. The transmission of the data and the request information goes through the same process as the data transmission in the contention access period 220, which is described before. Just as acknowledgement information for the data transmission is confirmed in a subsequent beacon, the network coordinator 105 puts response information for the request information into a beacon and transmits the beacon to the devices so that the devices can receive a response to their request information.

Backoff relieves collisions in a contention access period 220. A backoff process can be divided into an inter-superframe backoff based on a superframe unit and an intra-superframe backoff based on a time slot unit in a contention access period of a superframe. The two-step backoff process can effectively relieve collisions in which a plurality of users use the same time slot at the same time.

When a collision occurs in the superframe-based backoff, the next superframe to be transmitted is determined based on binary exponential backoff. When a collision occurs, a device selects a predetermined integer number k from a backoff window $[1,2^{BE-1}]$ where BE is an exponential parameter of the backoff window size, and attempts a message transmission in the $k^{th}$ superframe apart from the corresponding superframe. Herein, if collisions occur repeatedly, backoff is carried out with an increased value of BE, and the value of BE is limited by defining the maximum value of BE, $BE_{MAX}$.

The superframe-based backoff is useful for relieving the collision effect, when circumstances require the superframe-based backoff, for instance, when there is one time slot allocated to each group, when the only one time slot in a predetermined group is available since the other time slots allocated to a predetermined group are used for downlink communication in the network coordinator 105, or when the collision probability is high because the allocated time slots are not enough to accommodate data transmissions due to an increase in the quantity of data to be transmitted within a group.

As described above, a plurality of time slots can be allocated to a group including a plurality of devices in a contention access period 220. In the time slot-based backoff in a contention access period 220, the devices 110 of a group select time slots randomly among the allocated time slots. The backoff can reduce the number of recurring collisions in a time slot.

Figure 5:
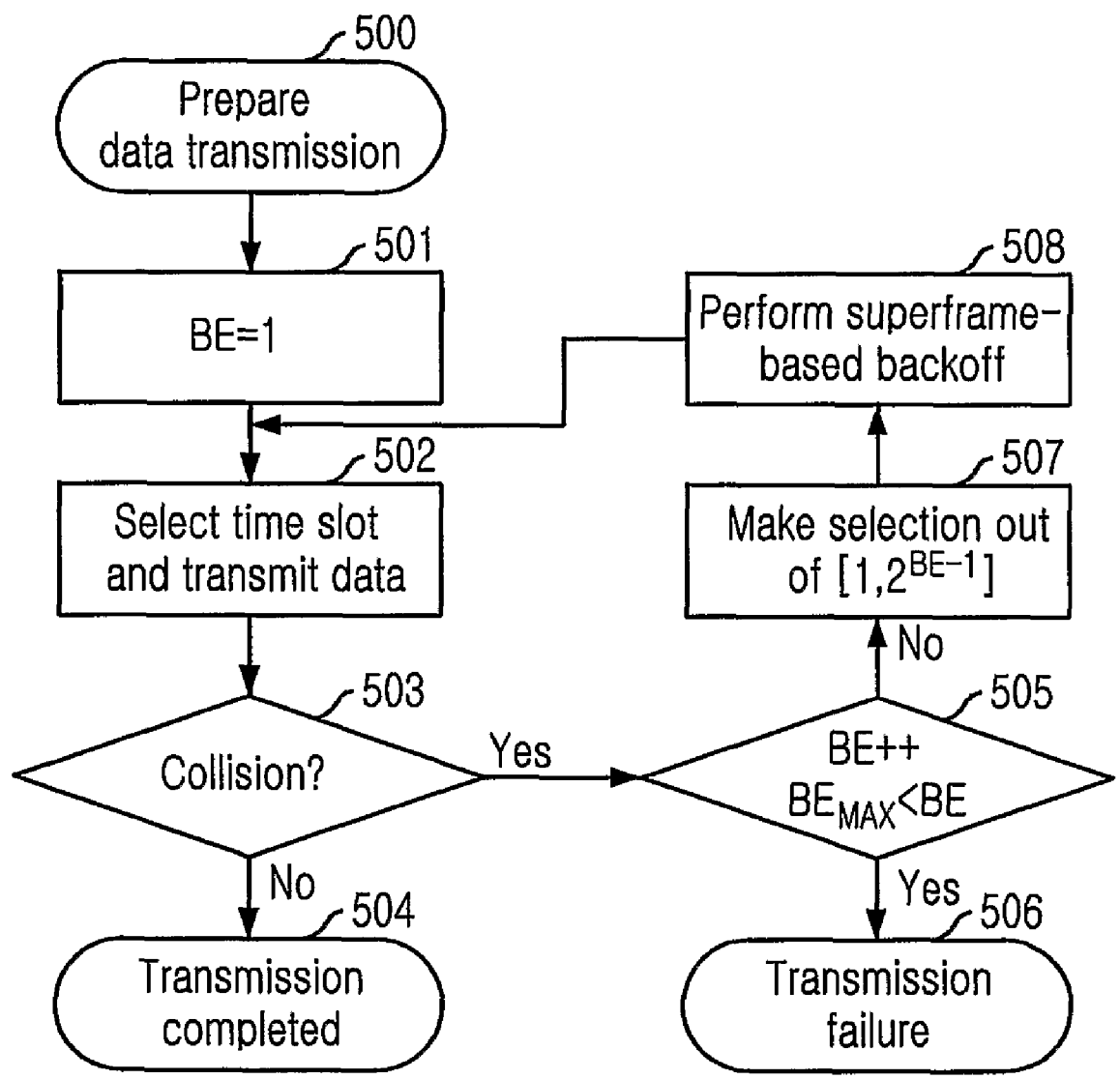
FIG. 5 is a flowchart describing a backoff method in accordance with an embodiment of the present invention.

FIG. 5 is a flowchart describing a backoff method in accordance with an embodiment of the present invention. A collision occurs in a contention access period 220 when more than two devices 110 select the same time slot 230 to transmit data. Due to the collision, the receiver 306 of the network coordinator 105 cannot demodulate the received signals properly, and the controller 301 of the network coordinator 105 cannot transmit acknowledgement information for the data transmission of the devices 110 in a corresponding time slot 230. Thus, the devices 110 which have transmitted data cannot receive the acknowledgement information and recognize the occurrence of a collision and executes a backoff algorithm stored in the storage 305.

As described in FIG. 5, when the device 110 is ready to transmit data in step 500, it initializes the value of BE into 1 in step 501 and performs data transmission by selecting a time slot in step 502. In short, a backoff is performed on a time slot basis. Subsequently, the presence of collisions is checked based on the acknowledgement in step 503. If there is no collision, it is regarded in step 504 that the data transmission is completed successfully. If there is a collision, the value of BE is increased by one and compared with the maximum value of BE, $BE_{MAX}$ in step 505. If the BE value is larger than the $BE_{MAX}$ value, the transmission is regarded as a failure in step 506, or if the BE value is equal to or smaller than the $BE_{MAX}$ value, an integer number is selected from a superframe backoff window $[1,2^{BE-1}]$ in step 507 and the superframe-based backoff is performed in step 508.

Figure 6:
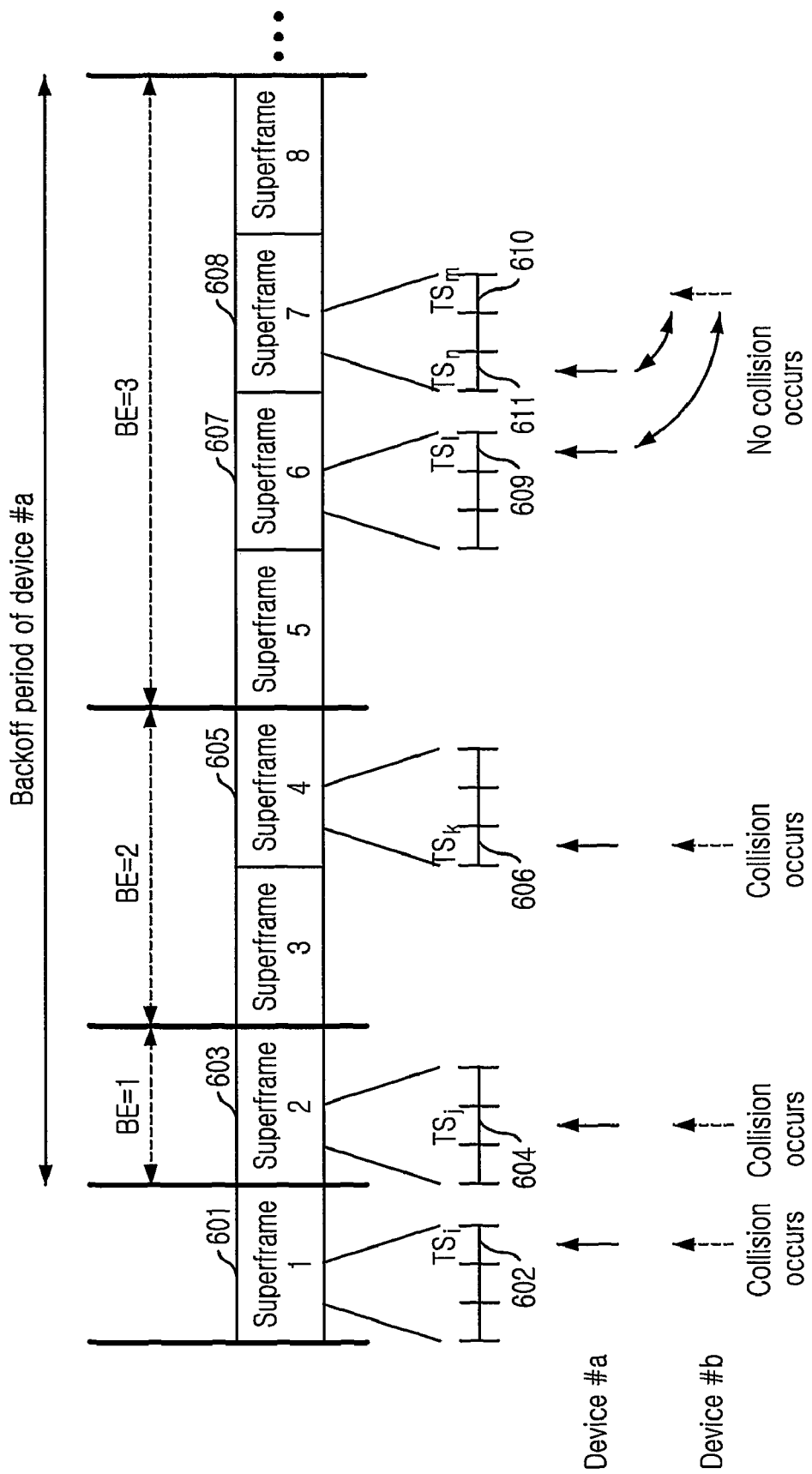
FIG. 6 is a diagram describing a backoff method in accordance with an embodiment of the present invention.

FIG. 6 is a diagram describing a backoff method in accordance with an embodiment of the present invention. As described in FIG. 6, it is assumed that devices #a and #b transmit data at the same time slot TS 602 in a superframe 1 601 to thereby cause a collision.

When a collision occurs, the devices select a predetermined integer number k among the backoff window $[1,2^{BE-1}]$ and attempt to transmit data in the $k^{th}$ superframe apart from the current superframe, i.e., the superframe 1. Herein, since the initial value of BE is 1, the backoff window becomes [1] in the initial collision. Thus, the predetermined integer number k is 1, and the devices #a and #b attempt to transmit data in the first superframe 2 603 from the superframe 1 601.

In the superframe 2 603, when the device #a selects a time slot $TS_j$ 604 for a data transmission and the device #b selects the time slot $TS_j$ 604 for a data transmission and, as a result, a collision occurs, the BE value is increased by one. Then, the backoff window becomes $[1, 2^{BE-1}]=[1,2]$ (BE=2), and the devices #a and #b transmit a message by randomly selecting one of the values of the backoff window [1,2]. When the device #a selects '1' and the device #b selects '2,' no collision occurs.

However, when both devices #a and #b of FIG. 6 select '2' and attempt data re-transmissions in a superframe 4 605 and then the devices #a and #b select the same time slot $TS_k$ 606 in the superframe 4 605, a collision occurs again. Thus, both devices #a and #b increase their backoff windows into $[1, 2^{BE-1}]=[1, 4]$ (BE=3).

Subsequently, as shown in FIG. 6, the device #a selects '2' while the device #b selects '3' and the devices #a and #b perform a backoff in a superframe 6 607 and a superframe 7 608, respectively. In the superframes 6 and 7, a time slot-based backoff scheme is performed. The device #a selects a time slot $TS_1$ 609 whereas the device #b selects a time slot $TS_m$ 610 and they transmit data without a collision. Although both devices #a and #b select '3' in the superframe-based backoff and perform backoff in the superframe 7 608, when the device #a performs the time slot-based backoff by selecting a time slot $TS_n$ 611 (n≠m) and the device #b performs the time slot-based backoff by selecting a time slot $TS_m$ 610 (n≠m), a collision does not occur either.

Figure 7:
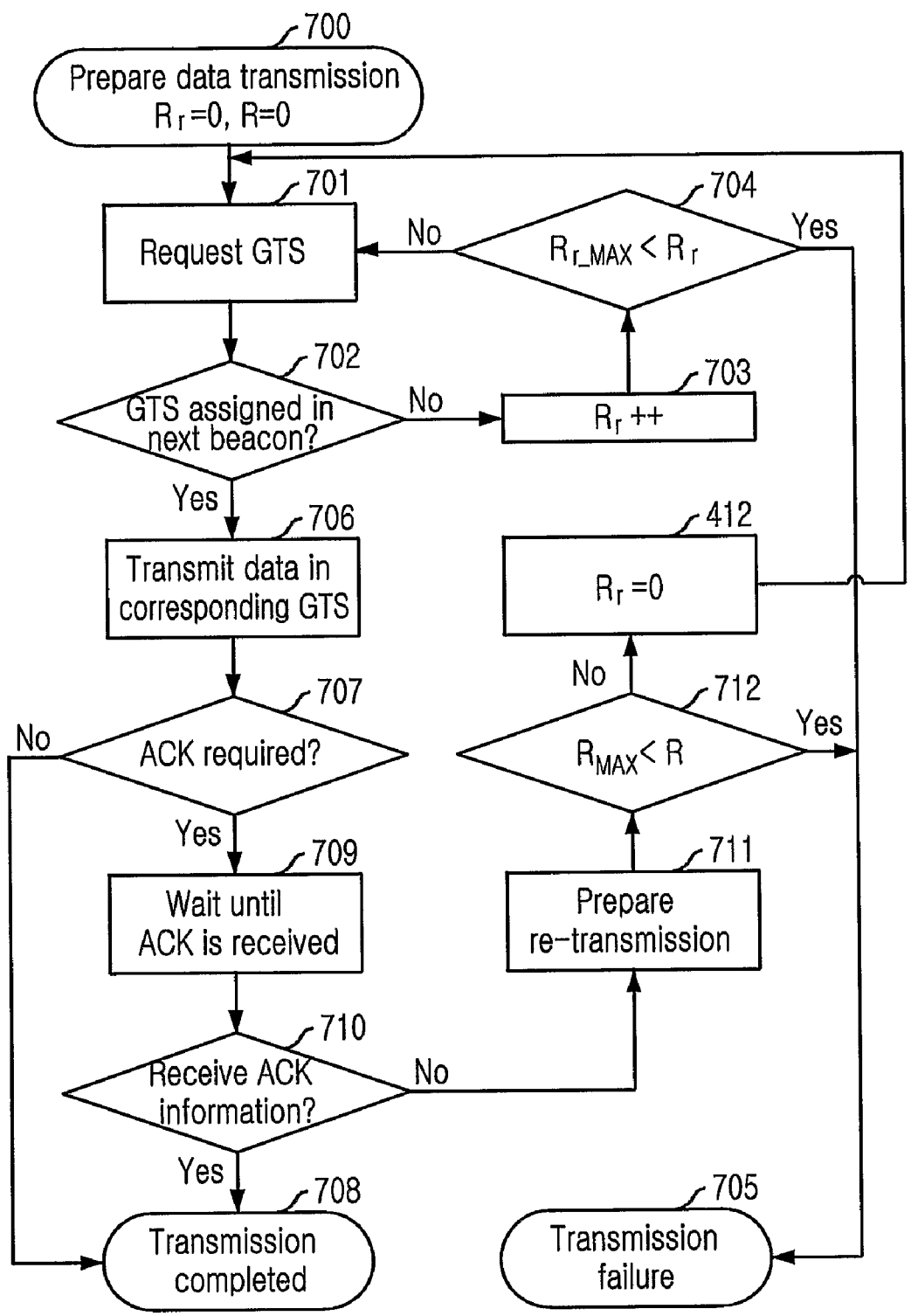
FIG. 7 is a flowchart illustrating a process for transmitting data between a general device and a network coordinator in a contention-free period in accordance with an embodiment of the present invention.

FIG. 7 is a flowchart illustrating a process for transmitting data between a general device and a network coordinator 105 in a contention-free period in accordance with an embodiment of the present invention. In the contention-free period, an operation algorithm and parameters are stored in the storage 305 of the general device 110 and the network coordinator 105 and executed by the controller 301.

As illustrated in FIG. 7, when data to be transmitted in the contention-free period 225 are generated, a device 110 initializes a parameter $R_r$ indicating the number of requests for a guaranteed time slot 235 and a parameter R indicating the number of data re-transmissions and prepares for a transmission in step 700.

When the devices 110 need the guaranteed time slot 235 in a contention-free period 225, they randomly select a time slot among the times slots allocated for their groups in the contention access period 220 and request the network coordinator 105 for a guaranteed time slot in step 701. This process goes through data transmission in a contention access period 220, which is described with reference to FIG. 3.

The network coordinator 105 schedules the guaranteed time slots 235 of the contention-free period 225 based on the guaranteed time slot request information transmitted from the devices 110 in the contention access period 220, puts the result in a beacon, and broadcasts the beacon to the devices of the network. Thus, in step 702, the device checks out a beacon transmitted after it requests for the guaranteed time slot 235 to see whether there is a guaranteed time slot 235 allocated thereto.

If no guaranteed time slot 235 is allocated to the device, the device increases the $R_r$ value of requesting for a guaranteed time slot 235 by one in step 703. Then, it compares it with the $R_{r\_MAX}$ value for guaranteed time slot requests in step 704 and, if the obtained $R_r$ value is larger than the $R_{r\_MAX}$ value, the request is regarded as a failure in step 705. If it is equal to or smaller than the $R_{r\_MAX}$ value, the logic flow goes back to the step 701 where it requests for a guaranteed time slot.

Meanwhile, when there is a guaranteed time slot 235 allocated to the device, the device transmits data by using the guaranteed time slot 235 in step 706. After it transmits data in the allocated guaranteed time slot 235, it determines whether the acknowledgement information is needed or not in step 707. If it does not need the acknowledgement information, it regards that the transmission is completed successfully in step 708. Otherwise, when it requires the acknowledgement information, it enters an inactive mode and waits in step 709 until it receives the acknowledgement in one time slot or a beacon including the acknowledgement information.

It waits for the acknowledgement information and checks out the presence of the acknowledgement information in step 710. When the acknowledgement information is received, it completes the data transmission in the step 708. When the acknowledgement information is still absent, it prepares to re-transmit the data in step 711. When it prepares for the data re-transmission, it increases the R value by one, compares it with the $R_{MAX}$ value in step 712. When the R value is larger than the $R_{MAX}$ value, it is regarded as a transmission failure in the step 705, or when R is equal to or smaller than $R_{MAX}$, the $R_r$ value is initialized in step 713 and the re-allocation for guaranteed time slot 235 is requested for data re-transmission in the step 701.

Figure 8:
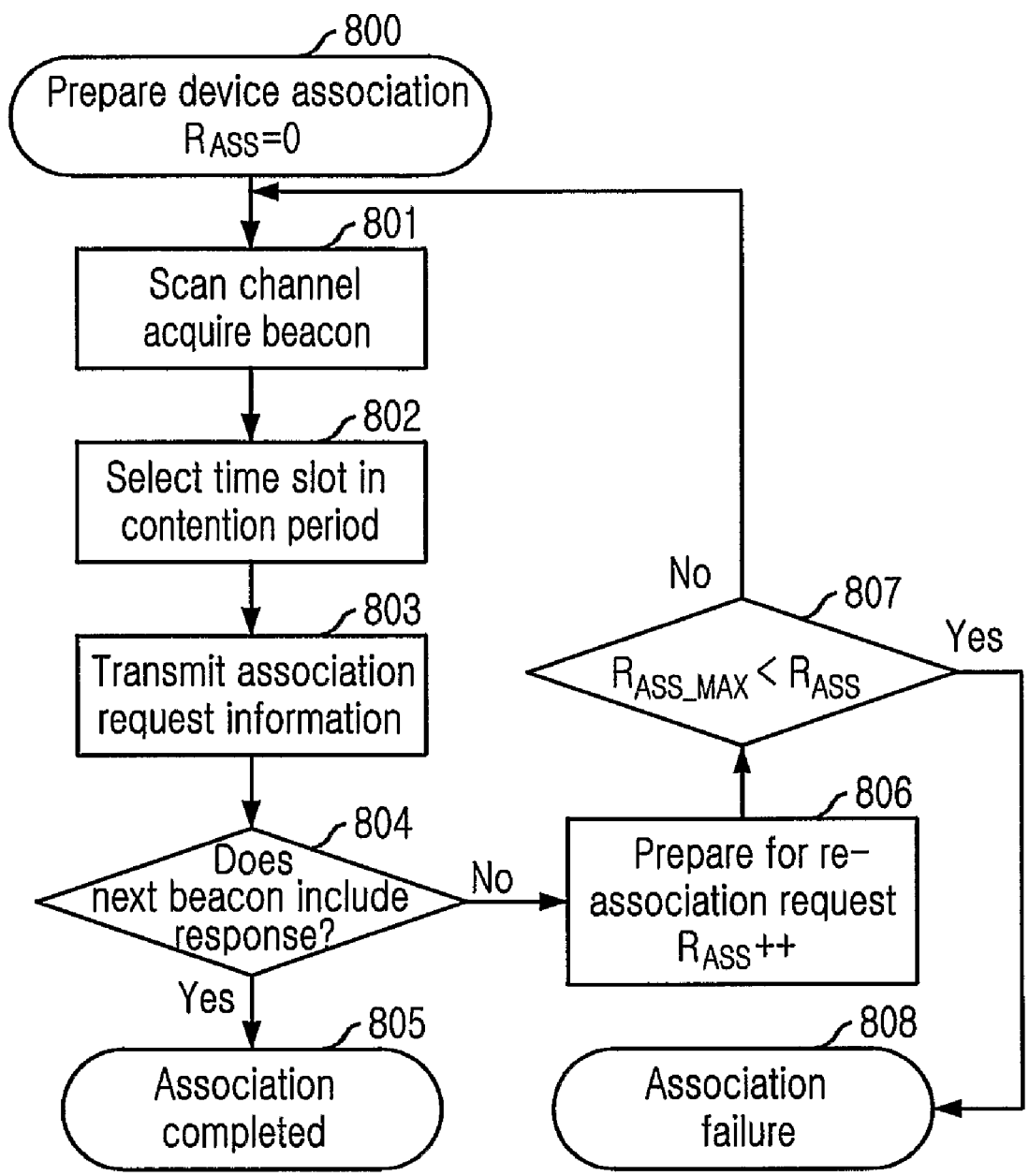
FIG. 8 is a flowchart describing a method for a general device being associated with a network in accordance with an embodiment of the present invention.

FIG. 8 is a flowchart describing a method for a general device being associated with a network in accordance with an embodiment of the present invention. The algorithm and needed parameters are stored in the storage 305 of the network coordinator 105 and the general device 110 and executed by the controller 301.

As described in FIG. 8, when the arbitrary device 110 searches to be associated with the network, it initializes a parameter $R_{ASS}$ indicating the number of association requests in step 800. It scans the channel and acquires a beacon transmitted by the network coordinator 105 in step 801. The beacon includes various types of timing information needed for communication within the network, e.g., time duration of a superframe 200, time duration of an active period 205, an inactive period 210, a beacon period 215, a contention access period 220 and a contention-free period 225, time duration of a time slot 230 of the contention access period 220 and a guaranteed time slot 235 of the contention-free period 225, which are described with reference to FIG. 2.

The device 110 which desires to be associated with the network is not yet assigned with a device number (address used in the network) in the initial period and, since it does not belong to any group, it does not have any pre-allocated time slot. Thus, it acquires timing information included in the beacon and arbitrarily selects a time slot among all time slots within a contention access period in step 802 and it transmits association request information to the network coordinator 105 in a corresponding time slot in step 803. After the association request information is transmitted, the device remains in the inactive mode to save power consumption until it acquires the next beacon information.

After the device 110 acquires the next beacon information, it checks out a response for an association request in step 804 and, if there is a response, it makes an association successfully in step 805. Otherwise, it prepares for another association request in step 806. That is, it increases the $R_{ASS}$ value by one, and compares it with the maximum number of association requests, $R_{ASS\_MAX}$ in step 807. When the $R_{ASS}$ value is larger than the $R_{ASS\_MAX}$ value, it determines that the association fails in step 808, or if it is equal to or smaller than the $R_{ASS\_MAX}$ value, it repeats the process of scanning channels and acquiring a beacon again in the step 801.

Figure 9:
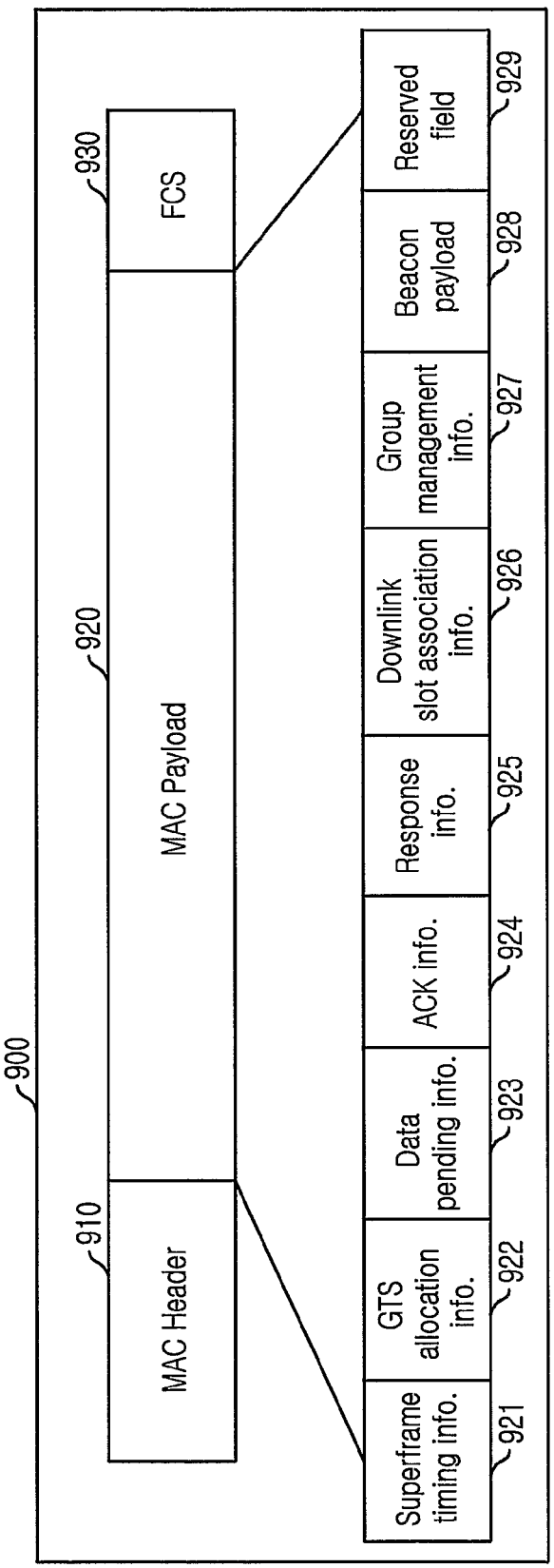
FIG. 9 is a diagram showing a frame structure of beacon information in accordance with an embodiment of the present invention.

FIG. 9 is a diagram showing a frame structure of beacon information in accordance with an embodiment of the present invention.

As described in FIG. 9, the MAC frame 900 of a MAC layer includes an MAC header 910, a MAC payload 920 and a frame check sequence (FCS) 930, and the MAC payload 920 includes beacon information.

A frame of the beacon information in the MAC payload 920 includes various information fields, such as a superframe timing information field 921, a guaranteed time slot allocation information field 922, a data pending information field 923, an acknowledgement information field 924 for data transmission, a response information field 925 for slot or control request information, a downlink slot allocation information field 926, a group management information field 927, a beacon payload field 928, and a reserved field 929.

The superframe timing information field 921 includes a time duration of a superframe, time duration of an active period 205, an inactive period 210, a beacon period 215, a contention access period 220 and a contention-free period 225, and time duration of a time slot of the contention access period 220 and a guaranteed time slot 235 of the contention-free period 225.

The guaranteed time slot allocation information field 922 includes a transmitter address and a receiver address for each guaranteed time slot 235 of the contention-free period 225 allocated to a transmitter and a receiver only.

The data pending information field 923 shows that the current network coordinator 105 has data or control information to be transmitted to predetermined devices of the network and it includes address informations of the devices.

The acknowledgement information field 924 includes acknowledgement information when the device 110 transmits data to the network coordinator 105 in contention access and contention-free periods of a previous superframe and it includes address information of a transmitter.

The response information field 925 for slot or control request information includes response information when the device transmits a slot request or a control request information to the network coordinator 105 in a contention access period of a previous superframe, and it includes information such as address of a transmitter, a response to the request for a control, and a reason for rejection to the control request.

The downlink slot allocation information field 926 includes time slot information for downlink communication which will be used when there is a message to be transmitted from the network coordinator 105 to predetermined devices in contention access and contention-free periods of a superframe. With this information, the network coordinator 105 prevents a time slot from being used by a predetermined group to thereby make the time slot used without collision.

The group management information field 927 includes a classification method for grouping devices of the network, information on the time slots in contention access periods allocated to each group, and information to be used when the collision probability of a predetermined group exceeds a predefined threshold or when a group needs to be classified again upon a request from the network.

The beacon payload 928 includes security information, and control information and/or control request information to be transmitted from the network coordinator 105 to more than one device 110.

The reserved field 929 is reserved to be used in case where it is needed for the network in future.

Hereinafter, a hopping pattern that can be applied to a time hopping system using an ultra wideband impulse signal in a time slot or a guaranteed time slot will be described.

Figure 10:
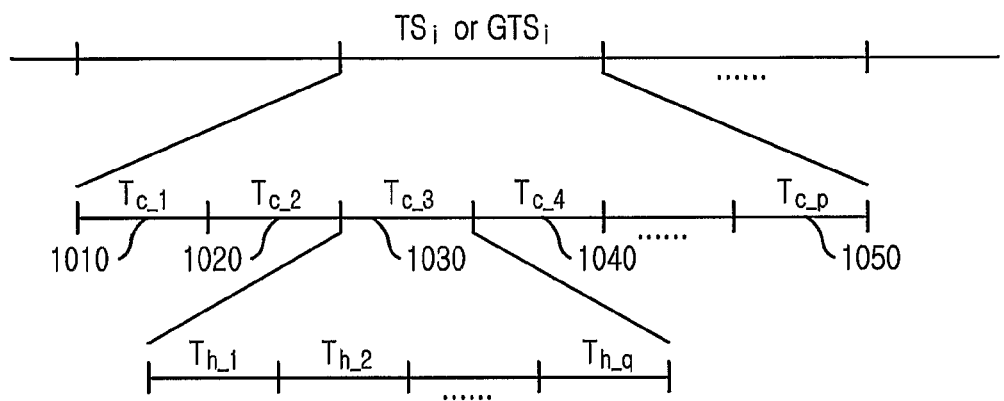
FIG. 10 is a diagram describing a time hopping structure in a time slot and a guaranteed time slot in accordance with an embodiment of the present invention.

FIG. 10 is a diagram describing a time hopping pattern in a time slot and a guaranteed time slot in accordance with an embodiment of the present invention.

A time slot or a guaranteed time slot is formed of more than one chip, i.e., $T_{c\_1}$ and $T_{c\_2}, \ldots, T_{c\_p}$ ($1 \leq p$), and one chip is formed of more than one hop, i.e., $T_{h\_1}$ and $T_{h\_2}, \ldots, T_{h\_q}$ ($1 \leq q$). A time hopping system is a system where information is transmitted at the only one hop in one chip, and the elements of the hopping pattern can be the same or random for each chip.

A hopping pattern $HP_i$ ($HP_i = \{T_{h\_i1}, T_{h\_i2}, \ldots, T_{h\_iP}\}$ of an $i^{th}$ time slot $TS_i$ ($i=1, \ldots, n$) or guaranteed time slot $GTS_i$ is defined by using a hop $T_{h\_i1}$ ($i1 \in \{1, \ldots, q\}$) in a chip $T_{c\_1}$ 1010, using a hop $T_{h\_i2}$ ($i2 \in \{1, \ldots, q\}$) in a chip $T_{c\_2}$ 1020, and using a hop $T_{h\_ip}$ ($ip \in \{1, \ldots, q\}$) in a chip $T_{c\_p}$ 1050 in the time slot $TS_i$ (i, 1, ..., n) or guaranteed time slot $GTS_i$ (i, 1, ..., m).

The hopping pattern of each slot is predetermined between the network coordinator 105 and the device so the transmitter and receiver using a predetermined slot communicate with each other by using the corresponding hopping pattern. The information on the hopping pattern is stored in the storage 305 of the radio communication device, and the controller 301 controls the transmitter and receiver 304 and 306 according to the timing information of the system clock unit and the hopping pattern stored in the storage 305.

Sharing the hopping pattern makes the hopping pattern managed simply within the network, and the time hopping system can relieve the spectral characteristics in the ultra wideband impulse communication and suppress other interference signals from or to other networks.

In the conventional narrow band communication, a channel is divided into frequency channels based on frequencies and a different frequency channel is used for each piconet so that multi-piconets are operated. However, since the ultra wideband communication uses a wideband which is as wide as several GHz, compared to a band of several MHz, which is used in the conventional narrowband communication, there is a limit in dividing a channel based on frequencies and using frequency-based channels. That is, with the limited band of 3.1 to 10.6 GHz that can be used in the ultra wideband communication, the number of multi-picotnets that can simultaneously support is limited. Thus, a method where the multi-piconets are divided temporally and operated will be described.

Figure 11:
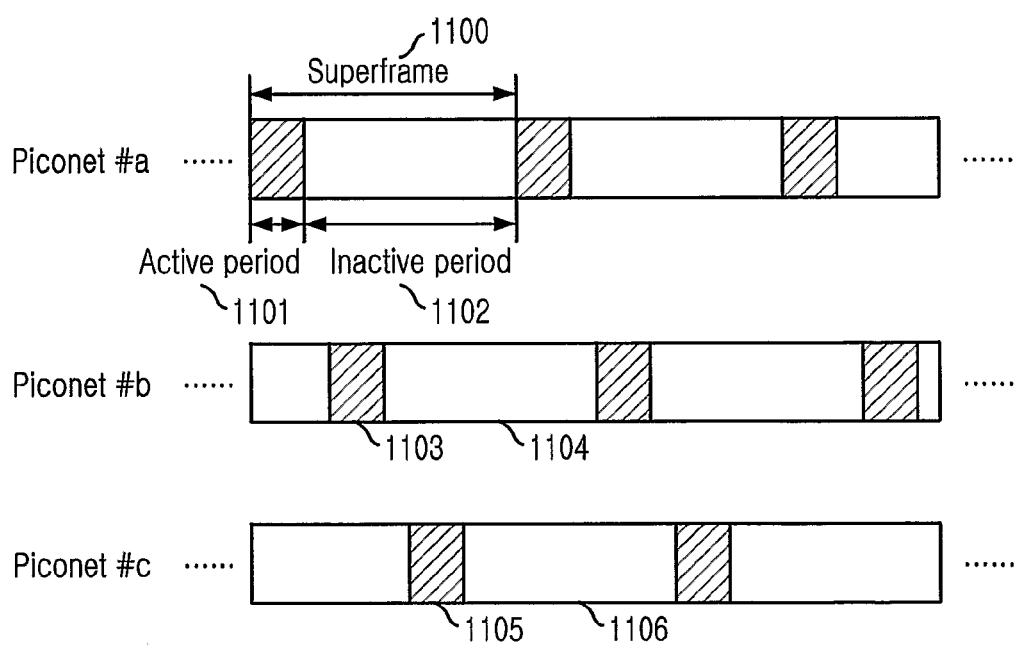
FIG. 11 is a diagram illustrating the operation of multi-piconets in accordance with an embodiment of the present invention.

FIG. 11 is a diagram illustrating the operation of multi-piconets in accordance with an embodiment of the present invention.

As illustrated in FIG. 11, the piconet communicates with temporally continual superframes 1100. As described above, one superframe 1100 is divided into an active period 1101 and an inactive period 1102. In the active period 1101, the network coordinator 105 and the devices of a piconet 110 are activated to communicate with each other. In the inactive period 1102, all the devices in the piconet are inactivated and they do not communicate with each other.

Thus, it is possible to form the operation structure of multi-piconets by using the inactive period 1102 in which all the devices of a piconet are inactivated and activating the other piconets for communication. As shown in FIG. 11, it is possible to set up an active period 1103 of the piconet #b to be operated by using the inactive period 1102 of the piconet #a, and an active period 1105 of the piconet #c to be operated by using the inactive period 1102 of the piconet #a and an inactive period 1104 of the piconet #b. When a new piconet is formed to expand the superframe, the inactive periods 1102, 1104 and 1106 of the piconets are checked out and the superframe is formed to be activated for communication within the inactive periods of the other piconets.

Figure 12:
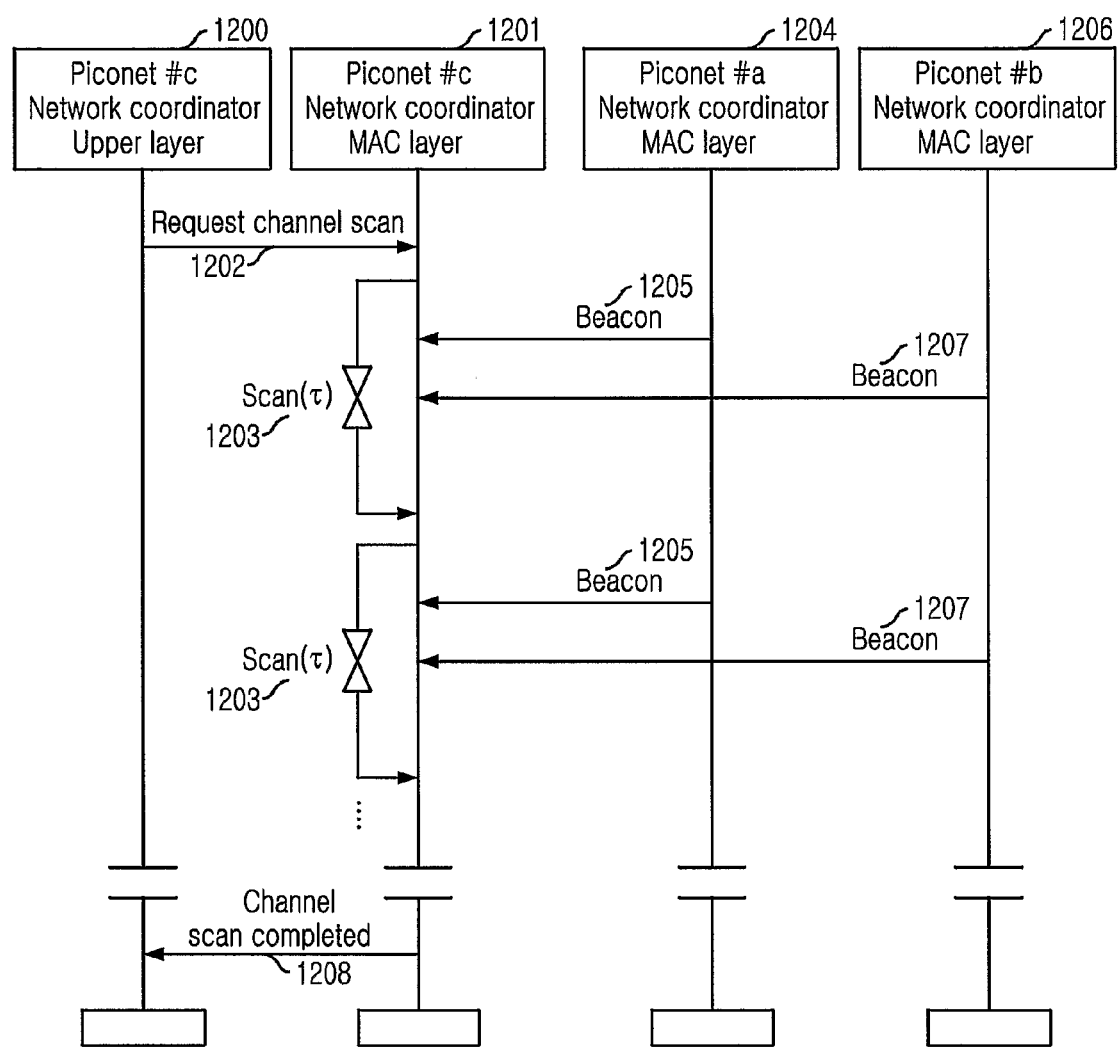
FIG. 12 is flowchart describing a channel scanning process for generating a new piconet in accordance with an embodiment of the present invention.

FIG. 12 is flowchart describing a channel scanning process for generating a new piconet in accordance with an embodiment of the present invention.

As described in FIG. 12, the network coordinator 105 of the piconet #c, which desires to form a new piconet, requests a MAC layer 1201 for channel scanning in a prior upper layer 1200 in step 1202. Then, the MAC layer 1201 scans a channel for a predetermined scanning time τ in step 1203. The scanning time τ can be the size of a superframe, which is a basic communication unit of a network.

The network coordinator 105 of the piconet #c scanning a channel can receive beacons 1205 broadcasted by the network coordinator 105 of the piconet #a in a MAC layer 1204 and beacons 1207 broadcast by the network coordinator 105 of the piconet #b in an MAC layer 1206. To receive the beacons without an error, the scanning process of the step 1203 is repeated.

As described above, since a beacon includes control information needed to operate a network and timing information such as the size of a superframe, the size of an active period, and the size of an inactive period, reception of a beacon makes it possible to reveal how the corresponding network is operated. Therefore, after the network coordinator 105 of the piconet #c receives the beacons of the piconets on service without an error, it informs that channel scanning is completed from the MAC layer 1201 to an upper layer 1200 in step 1208. As described in FIG. 11, the network can be operated by forming the superframe, active period and inactive period of the piconet #c by using the inactive periods of the other piconets.

The algorithm and the channel scanning process, which are needed to form multi-piconets and described above with reference to FIGS. 11 and 12, are stored in the storage 305 of a radio communication apparatus with parameters set up according to a network operation policy, and executed based on timing information of the system clock unit 302 under control of the controller 301.

Figure 13:
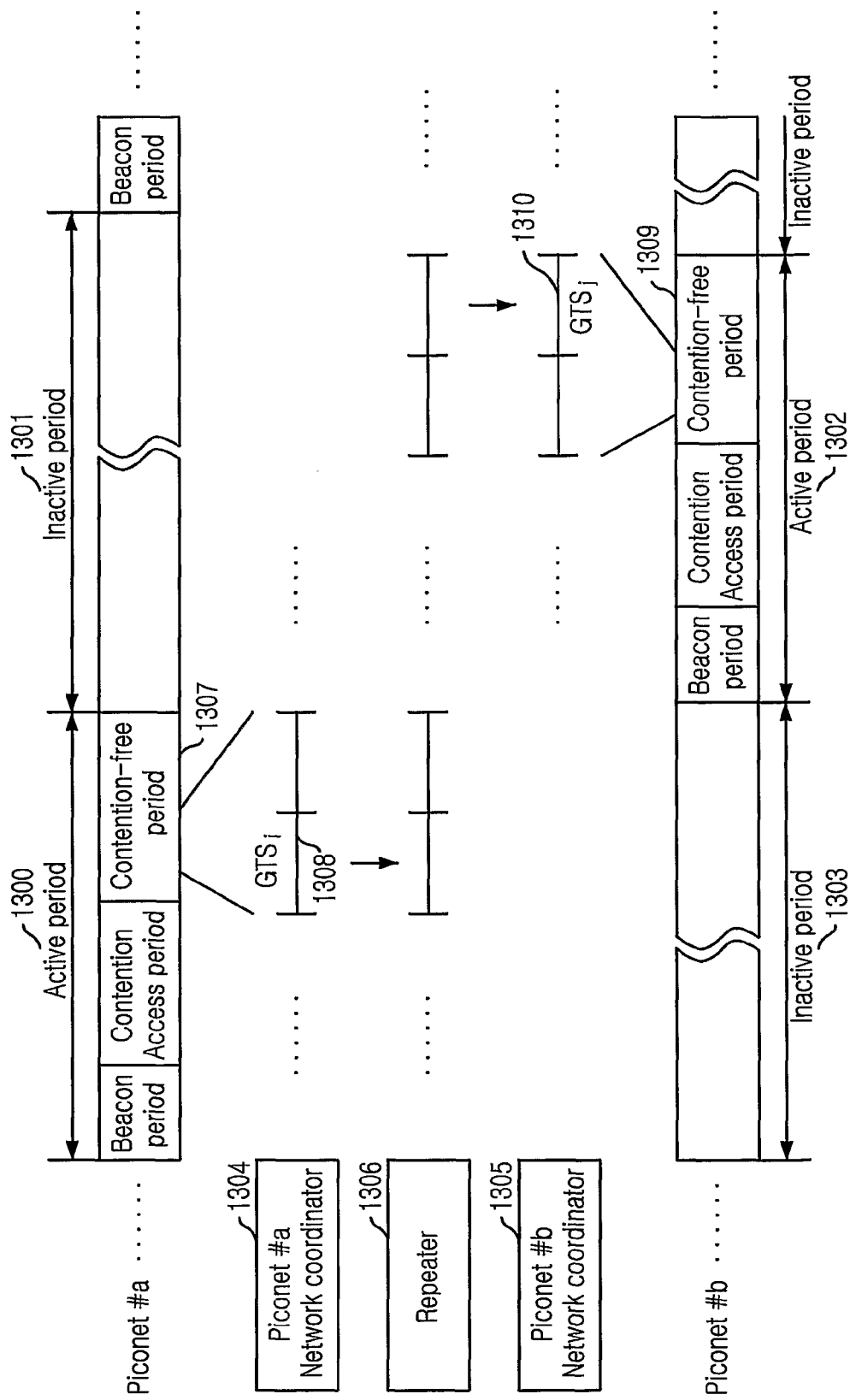
FIG. 13 is a diagram illustrating a process relaying data between piconets in accordance with an embodiment of the present invention.

FIG. 13 is a diagram illustrating a process relaying data between piconets in accordance with an embodiment of the present invention.

As shown in FIG. 13, while the multi-piconets are temporally divided and operated, the superframe of the piconet #a, i.e., an active period 1300 and an inactive period 1301, are operated continuously, and the superframe of the piconet #b, i.e., an active period 1302 and an inactive period 1303 are operated continuously. Herein, the network coordinator 1304 of the piconet #a transmits data through a repeater 1306 that can communicate between the piconet #a and the piconet #b, only when it has data to be transmitted to the network coordinator 1305 of the piconet #b. The data transmission process is as follows.

First, the network coordinator 1304 of the piconet #a transmits data to the repeater 1306 to relay in a guaranteed time slot 1308 of a contention-free period 1307, assigned in advance. The repeater 1306 requests the network coordinator 1305 of the piconet #b for a guaranteed time slot 1310 of a contention-free period 1309 for data relaying. Thus, data are relayed from the network coordinator 1304 of the piconet #a to the network coordinator 1305 of the piconet #b.

The relaying algorithm between piconets is stored in the storage 305 of the radio communication apparatus and executed based on the timing information of a system clock unit 302 under the control of the controller 301.

The method of the present invention, which is described above, can be realized as a program and stored in a computer-readable recording medium, such as CD-ROM, RAM, ROM, floppy disks, hard disks, magneto-optical disks and the like. Since the process can be easily implemented by those skilled in the art of the present invention, further description on it will not be provided herein.

While the present invention has been described with respect to certain preferred embodiments, it will be apparent to those skilled in the art that various changes and modifications may be made without departing from the scope of the invention as defined in the following claims.

What is claimed is:

1. A network coordinator operating a radio communication system by communicating with one or more subordinate communication devices on a superframe basis,
wherein the superframe comprises:
a beacon period in which the network coordinator transmits a beacon to the communication devices, wherein the beacon includes group management information on grouping radio communication devices into one or more groups;
a contention period in which the communication devices contend with each other for multiple access to the network coordinator; and
a contention-free period in which the network coordinator allocates time slots to intended communication devices among the communication devices and thereby the intended communication devices make an access without contention,
wherein the network coordinator classifies the communication devices into one or more groups and provides the communication devices with information to determine access timing according to the groups in the contention period in advance through the beacon.

2. The network coordinator as recited in claim 1, which informs the communication devices of information on time slots established for downlink communication among time slots of the contention period and the contention-free period through a beacon.

3. The network coordinator as recited in claim 1, wherein the communication devices perform a backoff on a superframe basis when collision occurs in a contention period.

4. The network coordinator as recited in claim 3, wherein the communication devices perform a time slot-based backoff to transmit data by selecting arbitrary slots among time slots pre-allocated in a contention period of the superframe.

5. The network coordinator as recited in claim 3 or 4, wherein the communication devices perform a binary exponential backoff on a superframe basis.

6. The network coordinator as recited in claim 1, wherein a frame of the beacon includes:
a field for providing superframe timing information;
a field for providing allocation information of a guaranteed time slot in a contention-free period;
a field for providing information on data to be transmitted to a communication device;
a field for providing acknowledgement information on data transmission;
a field for providing response information to a time slot request or a control request;
a field for providing information on time slots to be used for downlink communication; and
a field for providing communication device group management information.

7. The network coordinator as recited in claim 1, wherein a time hopping pattern used in a time slot of the contention period and a guaranteed time slot of the contention-free period is defined in advance between the network coordinator and the communication devices, and communication is carried out based on the defined time hopping pattern.

8. A network coordinator used in a radio communication system including a plurality of radio networks each including a plurality of radio communication devices and a network coordinator communicating with the radio communication devices on a superframe basis,
wherein a superframe of each radio network includes an active period in which the communication devices of a network participate in communication while maintaining an active state; and an inactive period in which the communication devices of the network remain in an inactive state, and
the network coordinator of each radio network establishes a structure of the superframe to have an active period of the radio network overlapped with inactive periods of other radio networks.

9. The network coordinator as recited in claim 8, wherein the active period includes:
a beacon period in which the network coordinator transmits a beacon;
a contention period in which the radio communication devices contend with each other for multiple access to the network coordinator of a corresponding radio network; and
a contention-free period in which the network coordinator allocates time slots to intended radio communication devices among the radio communication devices and the intended radio communication devices make an access to the network coordinator without contention.

10. The network coordinator as recited in claim 9, which additionally includes a new network coordinator, and the new network coordinator generates a new radio network by receiving beacons transmitted from network coordinators of the radio networks and establishing the active period of a corresponding superframe to be overlapped with the inactive periods of the radio networks based on superframe timing informations included in the received beacons.

11. The network coordinator as recited in claim 9, wherein the radio communication devices relay data to another radio network through guaranteed time slots of contention-free periods of the corresponding radio network.

12. A radio communication method in a plurality of radio communication devices subordinated to and communicating with a network coordinator operating a radio network on a superframe basis, the method comprising:
being classified by the network coordinator into a predetermined group and receiving from the network coordinator information to determine access timing according to the group in contention periods; and
randomly accessing and transmitting data to the network coordinator in a timing determined based on the information to determine access timing,
wherein the superframe comprises:
a beacon period in which the network coordinator transmits a beacon, wherein the beacon includes group management information on grouping radio communication devices into one or more groups;
a contention period in which the radio communication devices contend with each other for multiple access to the network coordinator; and
a contention-free period in which the network coordinator allocates time slots to intended radio communication devices among the radio communication devices and the intended radio communication devices make an access to the network coordinator without contention.

13. The method as recited in claim 12, further comprising:
performing a backoff on a superframe basis in the radio communication devices, when a collision occurs.

14. The method as recited in claim 13, further comprising:
performing a backoff on a time slot basis in the radio communication devices by selecting arbitrary slots among time slots pre-allocated to the contention period of a superframe and transmitting data.

15. The method as recited in claim 13 or 14, wherein the superframe-based backoff is a binary exponential backoff.

16. The method as recited in claim 12, wherein the network coordinator transmits time slot allocation information through the beacon during the time slot allocation.

17. The method as recited in claim 12, further comprising:
receiving information on time slots for downlink communication in the contention period and the contention-free period through the beacon from the network coordinator in the multiple radio communication devices.

18. The method as recited in claim 12, wherein a frame of the beacon includes:
a field for providing superframe timing information;
a field for providing allocation information of a guaranteed time slot in the contention-free period;
a field for providing data information to be transmitted to a communication device;
a field for providing acknowledgement information on data transmission;
a field for providing response information to a time slot request or a control request;
a field for providing information on time slots to be used for downlink communication; and
a field for providing group management information of communication devices.

19. A radio communication method of a network coordinator operating a radio network in a radio communication environment including a plurality of radio networks communicating on a basis of a superframe configured to have an active period where beacon information is transmitted and an inactive period, the method comprising:
receiving beacon information of a second radio network; and
establishing the active period of a corresponding superframe of a first radio network to be overlapped with an inactive period of the second radio network based on the beacon information of the second radio network.

20. The method as recited in claim 19, wherein the active period includes:
a beacon period in which the network coordinator transmits a beacon;
a contention period in which radio communication devices of a radio network contend with each other for multiple access to the network coordinator; and
a contention-free period in which the network coordinator allocates time slots to radio communication devices in need of time slots among the radio communication devices and the radio communication devices with the time slots allocated thereto make an access to the network coordinator without contention.

21. A radio communication method in a radio network including a plurality of radio communication devices and a network coordinator communicating with the radio communication devices on a superframe basis, the method comprising:
acquiring a beacon from the network coordinator of a radio network through channel scanning in a radio communication device not belonging to the radio network; and accessing to arbitrary time slots of a contention period of the radio network and transmitting association request information to the network coordinator in the radio communication device not belonging to the radio network, wherein the beacon includes group management information on grouping radio communication devices into one or more groups, and wherein the superframe comprises:

a beacon period in which the network coordinator transmits the beacon;

a contention period in which the network coordinator divides the radio communication devices into one or more groups and allocates available time slots to each group; and a contention-free period in which the network coordinator allocates time slots to radio communication devices in need of time slots among the radio communication devices and the radio communication devices with the time slots allocated thereto make an access without contention.

22. The method as recited in claim 21, wherein the beacon includes time duration information of the superframe.

23. The method as recited in claim 21, further comprising: the radio communication device not belonging to the radio network maintaining an inactive state to reduce power consumption while waiting for a response to a request to be included in a next beacon after the radio communication device makes the association request.

* * * * *